(12) United States Patent
Teglia

(10) Patent No.: US 7,853,010 B2
(45) Date of Patent: Dec. 14, 2010

(54) TESTING OF AN ALGORITHM EXECUTED BY AN INTEGRATED CIRCUIT

(75) Inventor: Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 1051 days.

(21) Appl. No.: 10/442,588

(22) Filed: May 21, 2003

(65) Prior Publication Data

US 2003/0221117 A1 Nov. 27, 2003

(30) Foreign Application Priority Data

May 24, 2002 (FR) .................................. 02 06365

(51) Int. Cl.
*H04L 9/00* (2006.01)
(52) U.S. Cl. ................................ 380/1; 380/2; 713/194
(58) Field of Classification Search ..................... 380/1, 380/2; 713/193, 189, 167, 194
See application file for complete search history.

(56) References Cited

U.S. PATENT DOCUMENTS

| | | | | |
|---|---|---|---|---|
| 4,914,697 A | * | 4/1990 | Dabbish et al. | ................ 380/28 |
| 5,631,960 A | * | 5/1997 | Likens et al. | .................... 380/2 |
| 5,991,415 A | * | 11/1999 | Shamir | ......................... 380/30 |
| 5,995,629 A | * | 11/1999 | Reiner | .......................... 380/265 |
| 6,298,135 B1 | | 10/2001 | Messerges et al. | |
| 6,804,782 B1 | * | 10/2004 | Qiu et al. | ..................... 713/194 |
| 6,965,673 B1 | * | 11/2005 | Boneh et al. | .................. 380/28 |
| 2002/0124178 A1 | * | 9/2002 | Kocher et al. | ................ 713/193 |

FOREIGN PATENT DOCUMENTS

FR 2 810 821 A1 12/2001

OTHER PUBLICATIONS

Jered J. Floyd, 6.857 Computer & Network Security Final Project: Differential Fault Analysis, Dec. 19, 1996.*
French Search Report from French priority application No. 02/06365, filed May 24, 2002.
Kocher, P. et al., Differential Power Analysis, Advances in Cryptology Conference, Aug. 15-19, 1999. Proceedings, Lecutre Notes in Computer Science; vol. 1666, Berlin Springer DE, 1999, pp. 388-397, XP000863414.

* cited by examiner

*Primary Examiner*—Beemnet W Dada
(74) *Attorney, Agent, or Firm*—Lisa K. Jorgenson; James H. Morris; Wolf, Greenfield & Sacks, P.C.

(57) ABSTRACT

A method for testing the resistance of an algorithm using at least one secret quantity against attacks measuring physical effects of the execution of the algorithm by an integrated circuit, consisting of implementing statistical key search functions based on hypotheses about at least some bits thereof, by exploiting the input and output values of steps of the algorithm.

16 Claims, 2 Drawing Sheets

| | DATA1,KEY | DATAj,KEY | DATAm,KEY |
|---|---|---|---|
| STEP1 | IN(1,1);OUT(1,1) | IN(1,j);OUT(1,j) | IN(1,m);OUT(1,m) |
| ⋮ | ⋮ | ⋮ | ⋮ |
| STEPk | IN(k,1);OUT(k,1) | IN(k,j);OUT(k,j) | IN(k,m);OUT(k,m) |
| ⋮ | ⋮ | ⋮ | ⋮ |
| STEPp | IN(p,1);OUT(p,1) | IN(p,j);OUT(p,j) | IN(p,m);OUT(p,m) |

TESTING OF AN ALGORITHM EXECUTED BY AN INTEGRATED CIRCUIT

BACKGROUND OF THE INVENTION

1. Field of the Invention

The present invention relates to the field of algorithms implemented by integrated circuits. The present invention more specifically relates to algorithms for cyphering, encrypting or the like using data as well as one or several secret keys used by the algorithm to cypher the data. Reference will be made hereafter to cyphering algorithms using secret keys and data but it should be noted that the present invention more generally applies to any function or series of functions of calculation or of combination of input data and of one or several keys and/or of one or several random words, to provide one or several cyphered messages outside of the integrated circuit.

2. Discussion of the Related Art

In this type of application, the algorithm is generally desired to be qualified, that is, its resistance against external attack attempts by unauthorized users trying to penetrate the "secret" of the key(s) used or of the cyphering implemented by the algorithm is desired to be evaluated. Such a qualification of an algorithm is performed with respect to a given type of attack, that is, an analysis method likely to be used by a possible pirate.

The present invention more specifically relates to the qualification of an algorithm with respect to so-called power or current attacks which consist of correlating the integrated circuit consumption with the internal variables of the algorithm. These variables are functions both of the input data and of the key which is searched and which is used by the integrated circuit. This key is contained in a storage element of the integrated circuit, and is thus known by said circuit, but not from the outside. Such power attacks are described in literature (see, for example, article "Differential Power Analysis" by Paul Kocher, Joshua Jaffe, and Benjamin Jun, published in 1999, Conference CRYPTO 99, pages 388-397, published by Springer-Verlag LNCS 1666) and are known as the differential power analysis (DPA).

A conventional method for testing the resistance of an algorithm against attacks of this type consists of using a device similar to that used to perform such an attack, to study the behavior of the algorithm.

FIG. 1 very schematically shows in the form of blocks a conventional example of a system for attacking an algorithm executed by an integrated circuit 1 (IC) by differential power analysis, or for testing the resistance of an algorithm against differential power analysis attacks of an integrated circuit 1 executing this algorithm.

Algorithm ALGO to be tested (or to be attacked) is generally contained in a specific block 2 (CYPH) of integrated circuit 1. Block 2 essentially has the function of executing an algorithm (block 3, detail of FIG. 1) or a function used, for example, for the cyphering/decyphering of data. Generally, the data are formed of any digital word and they may be programs or actual data. Algorithm ALGO cyphers the input data and provides output data CYPHDATA based on one or several keys and, possibly, on one or several random numbers ALEA.

In FIG. 1, only cyphering block 2 has been shown in integrated circuit 1, the rest of the integrated circuit being of any kind. Similarly, the present invention applies to any algorithm ALGO. It may be a symmetrical or asymmetrical cyphering algorithm, and the key(s) used may be contained in circuit 1 or come from the outside.

For a differential power analysis of integrated circuit 1 upon execution of algorithm 3, a device 6 having the function of measuring current I consumed by circuit 1 is interposed, on one of lines 4, 5 of supply by a voltage Valim of circuit 1. The measurement performed, for example, by an amperemeter 7 (A) interposed on line 4, is provided to a processor 10 (DPA PROC) in charge of correlating the consumed current I with the searched key. For this purpose, processor 10 exploits input/output signals of the integrated circuit. These signals have arbitrarily been illustrated by an input/output bus 8 of circuit 1 on which is interposed a device 9 of branching to processor 10. The supply voltage of circuit 1 may also be controlled by processor 10 (for example, by means of a voltmeter 11 (V) connected between lines 4 and 5).

Devices 6, 9, and 10 described in relation with FIG. 1 actually represent the devices used to implement differential power analysis attacks of circuit 1. To test the integrated circuit resistance to such attacks, the same kind of devices is conventionally used.

FIG. 2 illustrates, in the form of a table 20, a conventional example of implementation of a test of the resistance against attacks of differential current power analysis type of an integrated circuit such as shown in FIG. 1. In the example of FIG. 2, it is assumed for simplification that a single secret key is taken into account by the algorithm.

Data sets DATAj (j ranging between 1 and m) are generated, for example, randomly or pseudo-randomly, and are submitted at the algorithm input (block 3, FIG. 1).

At a regular algorithm execution interval (times Ti, i ranging between 1 and n), supply current $I(i,j)$ of the integrated circuit is measured. The set of measurements of current $I(i,j)$ is stored. The shorter the regular interval between times Ti, the better the accuracy of the analysis. The measured currents are a function of the key contained in the integrated circuit.

Hypotheses about all or part of the key are then formulated within processor 10, which are correlated to the consumption measurements (acquisitions).

As known, the current responses (all the measured currents) are analyzed at the different times. To test the resistance of integrated circuit 1 against power analysis attacks, it is checked whether the key is found after a number of trials by a DPA attack. A trial number threshold beyond which, if the key is not found, the algorithm is considered as resistant, is set. The resistance tests are thus performed on a final component (for example, a smart card).

A disadvantage of the conventional method is that the resistance of the entire circuit to a differential power analysis attack is actually tested. Accordingly, the tests are sensitive to possible parasitic noises which may mask weaknesses of the actual algorithm. Further, such noises are linked to the hardware implementation and may thus result in validating an algorithm on account of its implementation while it is in fact vulnerable to differential power analysis attacks.

SUMMARY OF THE INVENTION

The present invention aims at providing a novel solution for validating or testing the resistance of any algorithm to differential power analysis attacks of the integrated circuit which will execute this algorithm.

The present invention more specifically aims at providing a solution which is insensitive to parasitic noises of a specific implementation.

The present invention also aims at providing a solution which is independent from the type of integrated circuit in which the tested algorithm will be loaded.

To achieve these and other objects, the present invention provides a method for testing the resistance of an algorithm using at least one secret quantity against attacks measuring physical effects of the execution of the algorithm by an integrated circuit, consisting of implementing statistical key search functions based on hypotheses about at least some bits thereof, by exploiting the input and output values of steps of the algorithm.

According to an embodiment of the present invention, the input and output values of each of said steps of the algorithm are stored for different input data, and said statistical key search functions are applied to the stored values.

According to an embodiment of the present invention, a result combining, for each of said steps of the algorithm, the input and output values, is stored for different input data, and said statistical key search functions are applied to the combined results.

According to an embodiment of the present invention, said physical variable is the current consumption of an integrated circuit implementing the algorithm.

According to an embodiment of the present invention, said physical variable is the electromagnetic radiation of an integrated circuit implementing the algorithm.

According to an embodiment of the present invention, said physical variable is the temperature of an integrated circuit implementing the algorithm.

The foregoing objects, features and advantages of the present invention, will be discussed in detail in the following non-limiting description of specific embodiments in connection with the accompanying drawings.

DETAILED DESCRIPTION

A feature of the present invention is to test the resistance against differential power analysis from the algorithm itself, that is, from input and output data of the different steps implemented by this algorithm. Thus, the present invention provides replacing the current measurements performed on the finished integrated circuit by values handled by the algorithm itself.

Figures 3, 4:
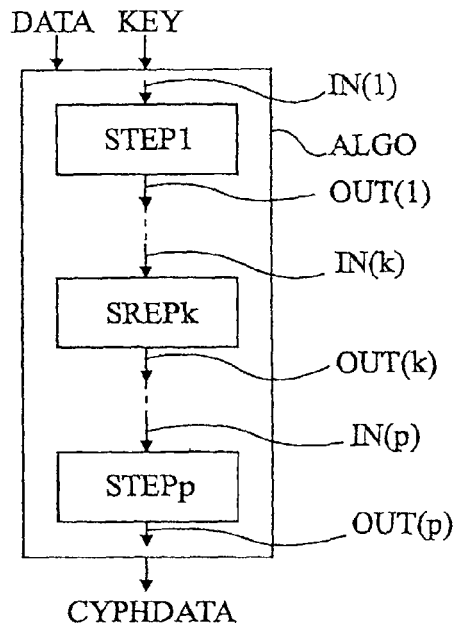
FIG. 3 illustrates in a simplified manner a cyphering algorithm of the type to which the present invention applies.
FIG. 4 illustrates an implementation mode of the testing method according to the present invention.

FIG. 3 illustrates, in the form of blocks, an example of algorithm ALGO, of which the resistance against attacks of DPA type is desired to be tested according to an implementation mode of the present invention. The algorithm receives, as inputs, data (DATA) and a secret key (KEY). For simplification, the case of a single key is considered. It should however be noted that the following also applies to an algorithm receiving as inputs several keys, and possibly one or several random values. The only difference is the number of hypotheses performed for the DPA attacks, and thus for the resistance tests.

Any algorithm comprises several steps illustrated in FIG. 3 by blocks (STEP1, STEPk, STEP). The algorithm provides, in this example, cyphered data (CYPHDATA). Each step processes one or several input variables IN(k) and provides one or several variables OUT(k).

FIG. 4 illustrates an implementation mode of the testing method according to the present invention, applied to a method of the type of that in FIG. 3.

Several data sets (DATAj, KEY) are generated as in a conventional method, the key corresponding to an arbitrarily chosen value (to simulate the key which will be contained in an integrated circuit executing the algorithm) which is desired to be found by the testing method.

According to the present invention, the input and output parameters and/or values $N(k,j)$ and $OUT(k,j)$, respectively, of the considered step, are stored for the different steps STEPk implemented by algorithm ALGO. For each set of rank j (DATAj, KEY), p sets of input and output values {IN$(k,j)$, OUT$(k,j)$, k ranging between 1 and p} are then obtained, as illustrated in table 40 of FIG. 4.

Figures 1, 2:
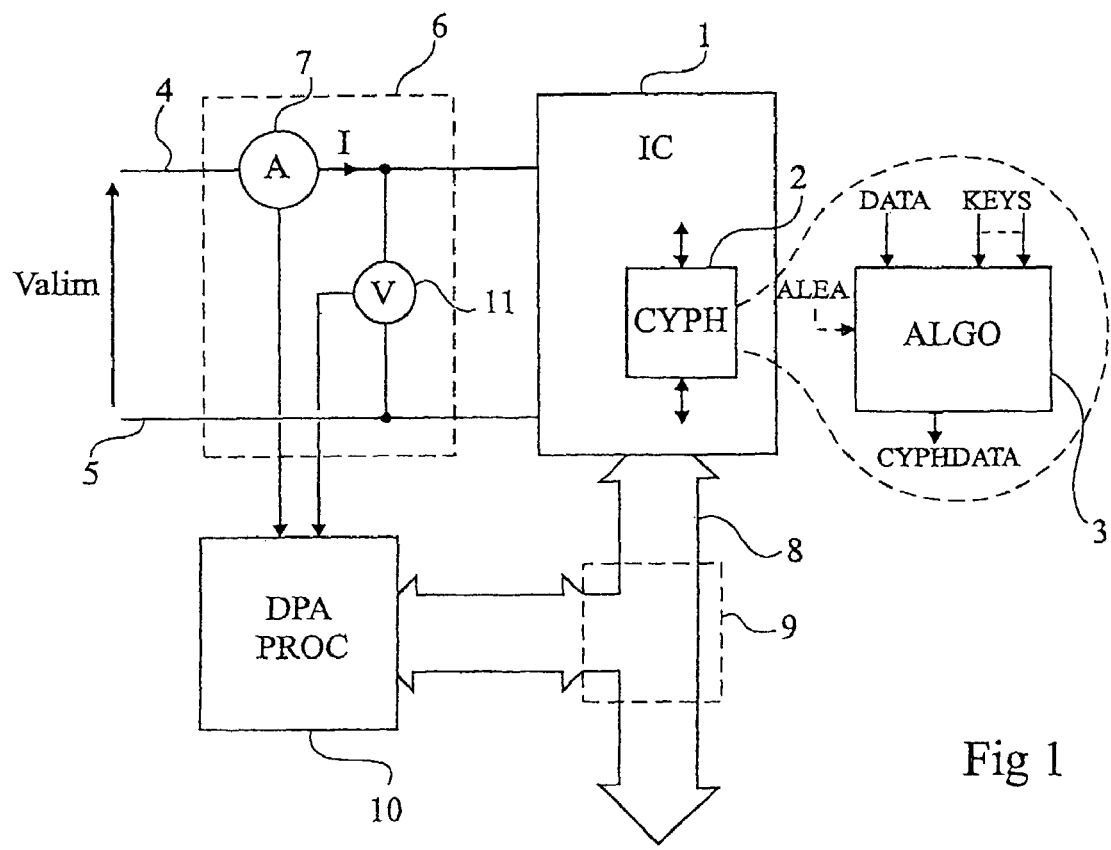
FIG. 1, previously described, schematically shows in the form of blocks a conventional example of a system of differential power analysis attack of an integrated circuit executing an algorithm.
FIG. 2, previously described, illustrates the implementation of a conventional test of the resistance of an algorithm against differential power analysis attacks of an integrated circuit implementing it.

According to the present invention, it is considered that when it executes a given function or step implementing input variables, the algorithm consumes a certain amount of current. Conventionally, the current intensity is stored in the measurement file at regular time intervals (FIG. 2). In fact, the intensity is the current image of the data handled at that time by the integrated circuit. According to the present invention, the handled values are directly stored. Further, rather than performing the storages at regular intervals, the very features of the algorithm are exploited by using the data of its different steps. Indeed, if the internal variables are decorrelated from the handled key, there is no reason for the power analysis to provide an exploitable result concerning the algorithm.

Conventional correlation functions are then applied to determine after how many acquisitions of processed data sets (j) the key is discovered.

An advantage of the present invention is that the correlation analysis is no longer polluted by noise. Thus, it is really the algorithm which is tested for its resistance against differential power analysis attacks.

The implementation of the present invention does effectively reflect a current analysis since the component integrating the algorithm will consume according to the handled data.

Another advantage of the present invention is that it enables qualifying or validating the resistance of an algorithm even before the practical implementation of the algorithm in an integrated circuit. Significant savings are thus made for the case where the tested algorithm would appear to be particularly vulnerable.

The number of data or parameters stored for each execution of the algorithm of course depends on the number of functions or steps of this algorithm. The test reliability clearly depends on the stored parameters. In particular, the test will only be reliable if all the values handled by the algorithm or at least its significant values have been stored for correlation.

According to an alternative, values IN and OUT are not stored but rather, for each step STEPk, it is the result of a function combining these values which is stored, for example, a function aiming at reproducing the electric behavior of the component, the aim being to anticipate the real behavior of the product with respect to attacks against which it is desired to provide.

The statistic correlation function implemented to detect the algorithm key is a function of the type of those conventionally implemented for current attacks. Similarly, the hypotheses to be made on the key(s) are the same as in conventional methods. As an example, reference may be made to the above-mentioned article "Differential Power Analysis".

It should be noted that the implementation of the present invention does not exclude a final checking of the manufactured component to make sure that the implementation has not resulted in a regression in terms of the security against current attacks.

Of course, the present invention is likely to have various alterations, modifications, and improvement which will readily occur to those skilled in the art. In particular, the present invention applies not only to the theoretical resistance of algorithms against differential power analysis attacks, but more generally to any attack exploiting measurements of physical effects of the execution of an algorithm on the circuit which executes it, by using statistical functions for searching at least one key based on hypotheses about at least some bits thereof. For example, the physical variable may be, rather than the consumption, an electromagnetic radiation or temperature. Further, if all the algorithm steps are taken into account, output data OUT(k) of a given step correspond to input data IN(k−1) of the next step. This may be taken into account for the memorization.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A computer-implemented method for testing a resistance of an algorithm using at least one secret quantity against attacks measuring a physical effect of an execution of the algorithm by an integrated circuit, comprising:
    formulating at least one hypothesis about at least some bits of the at least one secret quantity;
    storing, as stored values, input values to be processed by steps of the algorithm for different input data and respective algorithmic output values resulting from applying the steps of the algorithm to the input values;
    using at least one processor to evaluate the at least one hypothesis, comprising applying statistical key search functions to the stored values.

2. The method of claim 1, comprising storing, for different input data a result combining, for each of said steps of the algorithm, the input and output values, and applying said statistical key search functions to the result.

3. The method of claim 1, wherein said physical effect is a current consumption of an integrated circuit implementing the algorithm.

4. The method of claim 1, wherein said physical effect is electromagnetic radiation from an integrated circuit implementing the algorithm.

5. The method of claim 1, wherein said physical effect is a temperature of an integrated circuit implementing the algorithm.

6. A computer-implemented method of testing a cryptographic algorithm having a parameter, the method comprising acts of:
    running, on at least one processor, a first step of the cryptographic algorithm a plurality of times with a first plurality of different inputs, wherein the first step is an intermediate step;
    storing, by the at least one processor, a first plurality of algorithmic outputs resulting from applying the first step of the cryptographic algorithm respectively to the first plurality of different inputs; and
    running a statistical analysis based at least partially on the first plurality of algorithmic outputs of the first step; and
    determining a resistance of the cryptographic algorithm to discovery of at least a portion of the parameter by observation of a physical effect.

7. The method of claim 6, further comprising:
    running, on at least one processor, a second step of the cryptographic algorithm a plurality of times with a second plurality of different inputs;
    storing, by the at least one processor, a second plurality of algorithmic outputs resulting from applying the second step of the cryptographic algorithm respectively to the second plurality of different inputs; and
    running the statistical analysis based at least partially on the second plurality of algorithmic outputs.

8. The method of claim 6, wherein the statistical analysis comprises a statistical correlation function.

9. The method of claim 6, wherein the statistical analysis comprises a differential power analysis technique.

10. The method of claim 6, wherein the physical effect is a power consumption of the device.

11. The method of claim 6, wherein the physical effect is a current consumption of the device.

12. The method of claim 6, further comprising storing the first and second pluralities of different inputs.

13. The method of claim 6, wherein the parameter of the first step comprises a secret key.

14. A computer-implemented method, comprising:
    storing input values to an algorithm;
    running the algorithm using a secret quantity and the input values;
    storing output values produced by the algorithm; and
    statistically analyzing the input and output values to determine information regarding the secret quantity;
    whereby a resistance of the algorithm against an attack measuring a physical effect of executing the algorithm on a circuit is evaluated.

15. The method of claim 14, wherein said physical effect is a current consumption of a circuit implementing the algorithm.

16. The method of claim 14, wherein said physical effect is electromagnetic radiation from a circuit implementing the algorithm.

* * * * *